United States Patent [19]

Tomosue

[11] Patent Number: 4,603,772
[45] Date of Patent: Aug. 5, 1986

[54] SHIFTING DEVICE FOR OBJECTS, SUCH AS EGGS, TO BE HANDLED

[76] Inventor: Hiroshi Tomosue, 1855, Shimoyokono, Tuyama City, Okayama Prefecture, Japan

[21] Appl. No.: 648,219

[22] Filed: Sep. 7, 1984

[30] Foreign Application Priority Data

Nov. 7, 1983 [JP] Japan ................................ 58-209583

[51] Int. Cl.$^4$ .............................................. B65G 47/26
[52] U.S. Cl. .................................. 198/424; 198/468.8; 198/534
[58] Field of Search .................... 198/424, 485, 468.8, 198/468.01, 534; 53/248, 539

[56]  References Cited

U.S. PATENT DOCUMENTS

| 3,460,316 | 8/1969 | Mumma | 53/539 X |
| 3,894,631 | 7/1975 | Rose et al. | 198/424 X |
| 3,964,233 | 6/1976 | Thomas | 198/424 X |
| 3,973,667 | 8/1976 | Jellema et al. | 198/424 |
| 4,261,158 | 4/1981 | Van Kattenbroek | 53/248 |
| 4,360,099 | 11/1982 | Niederer et al. | 198/424 |

FOREIGN PATENT DOCUMENTS

| 2440477 | 3/1975 | Fed. Rep. of Germany | 198/424 |
| 58-73515 | 5/1983 | Japan . | |
| 6717724 | 7/1969 | Netherlands | 198/485 |

Primary Examiner—Joseph E. Valenza
Assistant Examiner—Jonathan D. Holmes
Attorney, Agent, or Firm—Armstrong, Nikaido, Marmelstein & Kubovcik

[57] ABSTRACT

A shifting device installed between a discharge conveyor for objects, such as eggs, to be processed and a receiving conveyor for the same and below the discharge conveyor, and provided with delivery devices for the objects to be processed, the delivery devices extending laterally and supported vertically in two rows and including receiving seats for the objects to be processed, which seats are disposed in parallel to each other and have the bottoms freely opening or closing so that the objects to be handled, after once received by the upper delivery device, are shifted to the lower delivery device and the lower delivery device lowers in proximity to the lower receiving conveyor, thereby shifting the objects thereto in safety without injuring the objects to be handled.

2 Claims, 10 Drawing Figures

SHIFTING DEVICE FOR OBJECTS, SUCH AS EGGS, TO BE HANDLED

BACKGROUND AND SUMMARY OF THE INVENTION

This invention relates to a device for shifting breakable objects, such as eggs or fruits, to be handled, from one conveyor to another conveyor moving at higher speed, or from the conveyor to a packing container, in safety without breakage.

In cases where objects, such as eggs, are subjected to mechanical sorting and mechanical packing at high speed, the objects are shifted from one conveyor to another conveyor or to a packing container carried by the conveyor. Various ways have been proposed to improve the shifting of the objects in safety.

In order to ensure safety, in handling the handling speed is sacrificed, while, in order to increase handling speed, safety in handling is sacrificed. When the handling speed is increased with safety in handling, the mechanical device is abnormally complicated, expensive to produce, or liable to cause a problem, such as break-downs.

For example, an "egg packing device" described in Japanese Patent Laid-Open Gazette No. 73515/1983, comprises a feeder for intermittently holding eggs and feeding them, a stationary egg-lowering plate which has a groove extending from near the upper end toward the lower end and guides eggs downwardly through the groove, and a conveyor, which operates intermittently and in synchronism with the feeder, and including a chain belt carrying support plates in regular intervals, for holding the eggs between the lowering plate and the support plates, and transports the turned eggs downwardly along the groove. This device is adapted to transport the eggs by the support plates toward an opening at a recess of an egg packing container, thereby shifting them into the packing container in safety and at high speed without cracking or breaking the eggs. This device, however, aims at turning the eggs, as they are transported while being sandwiched between the lowering plates and the support plates. The speed of feeder is limited and the eggs are dropped into the packing container while keeping downward inertia. Hence, it is impossible to completely prevent the breakage of egg.

Other conventional devices are so constructed that the objects to be handled, when shifted, are transported downwardly and, thereafter, dropped without cutting off the downward inertia, again casing breakage. It is extremely difficult for the conventional device to shift the objects in safety and at high speed.

This invention eliminates the above defects in the conventional device. The shifting device of the invention is so constructed that delivery devices for the objects to be handled are provided with a plurality of receiving seats, separated for the respective objects to be handled, and juxtaposed horizontally, and have the bottoms freely opening or closing. The receiving seats are disposed vertically in two rows. The lower delivery device moves vertically in reciprocation and the bottoms thereof are kept open from the end of downward stroke of the lower delivery device to the start of upward stroke of the same and closed prior to the end of upward stroke. The bottom of each receiving seat of the upper delivery device is adapted to be open when the lower delivery device ends its upward stroke and the bottom of each receiving seat at the lower delivery device is in condition of closing.

Hence, the objects to be handled, when discharged from an upper discharge conveyor, are held by the upper delivery device. The lower delivery device lifts to approach the upper delivery device so as to shift the objects to the lower delivery device. The lower delivery device is then lowered to cut off the downward inertia of the objects to be handled. The objects being handled are shifted to the lower receiving conveyor in safety and at high speed.

An object of the invention is to provide a shifting device which is capable of shifting the objects, such as eggs, to be handled during the mechanical sorting and mechanical packing process in safety and at high speed.

Another object of the invention is to provide a shifting device simple and strong in construction and inexpensive to produce and parts.

These and other objects of the invention will become more apparent in the detailed description and examples which follow:

DESCRIPTION OF THE PREFERRED EMBODIMENT

Figure 1:
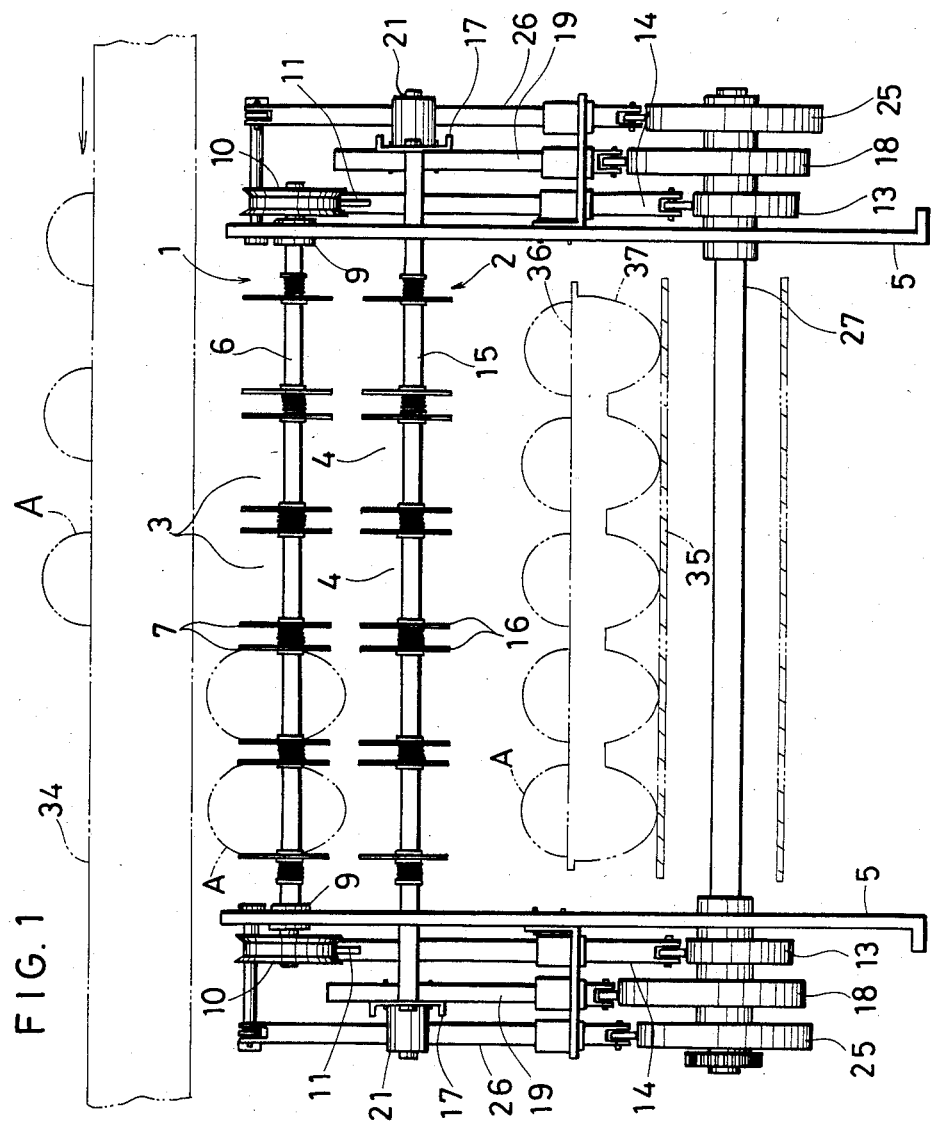
FIG. 1 is a front view of an embodiment of a shifting device of the invention.

An embodiment of a shifting device of the invention will be described in accordance with the drawings, in which reference numeral 1 designates an upper device of a delivery device for objects to be handled and disposed vertically in two rows and 2 designates a lower device. The devices 1 and 2 are provided with a plurality of separate receiving seats 3 and 4 respectively, laterally juxtaposed, the bottom of each seat 3 and 4 being formed to be freely opened or closed. The lower device 2 moves vertically in reciprocation, and the bottoms of seats 4 are adapted to open between the end of the lowering stroke and the beginning of the lifting stroke and close prior to the end of the lifting stroke. The upper device 1 is so constructed that the bottom of seats 3 thereof are open when the bottoms of seats 4 of the lower device 2 are closed after the end of lifting stroke thereof. Reference 5 designates side frames for functionally supporting the upper and lower devices 1 and 2 from both lateral sides thereof.

Figure 2:
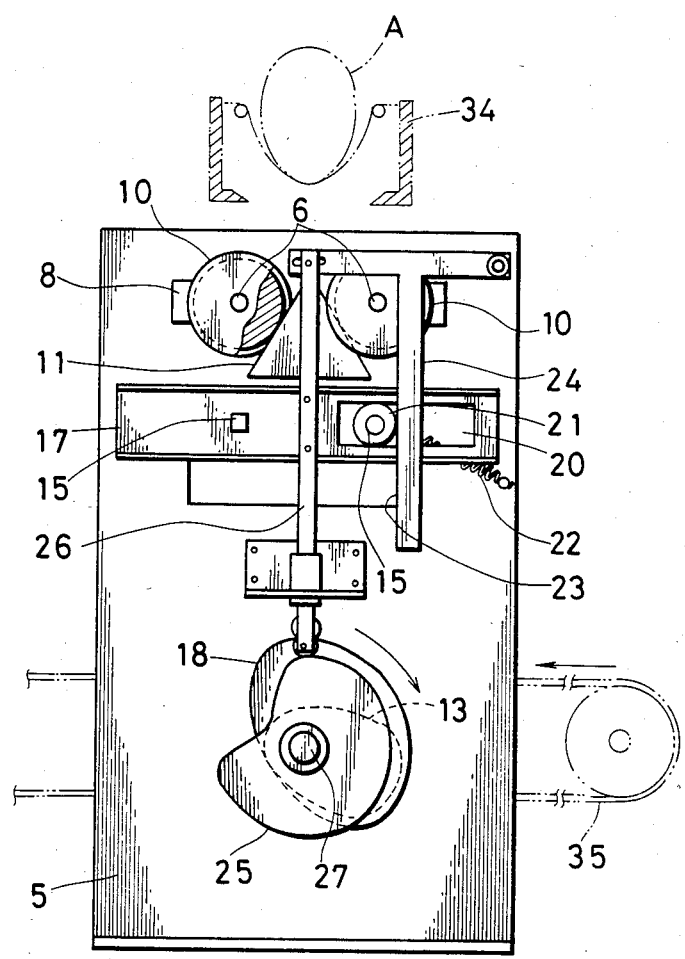
FIG. 2 is a side view of the FIG. 1 embodiment.
Figure 3:
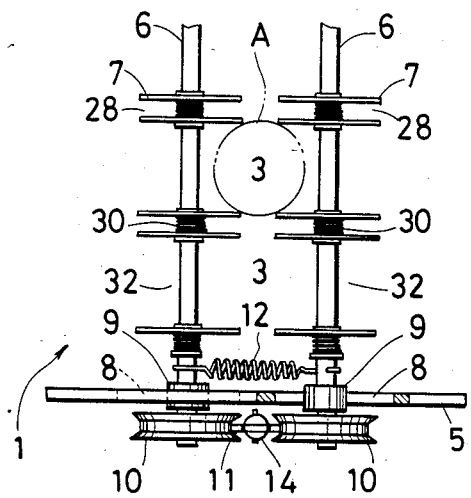
FIG. 3 is a plan view of the principal portion of an upper delivery device.

In further detail, the upper device 1 comprises two rods 6 FIG. 2, and a plurality of support segments 7 FIG. 1, formed of soft and elastic material, such as nylon, and juxtaposed and spaced at proper intervals, the support segments 7 being spaced lengthwise of the device and parallel and opposite to each other, thereby forming receiving seats 3 each surrounded by the support segments 7 opposite and parallel to each other as shown in FIG. 3.

The receiving seat bottoms are open or closed with ease by adjusting gaps between the opposite support segments 7. For example, the rods 6 need only be adjusted of a distance therebetween, or both or either one of rods 6 need only be turned at a proper angle. The embodiment shown in the drawing adjusts the distance between the rods 6.

In detail, the rods 6 are supported at both lateral ends slidably through slidable member 9 into elongate slots 8 provided at the side plates 5 and have rollers 10 at both ends. Wedges 11 are interposed between the rollers 10 at both ends of rods 6, spring 12 for pulling the rods 6 are provided therebetween, so that eccentric cams 13 move the wedges 11 vertically through connecting rods 14 respectively, thereby adjusting the distance between the rods 6 to open or close the bottom of each receiving seat 3.

Figure 4:
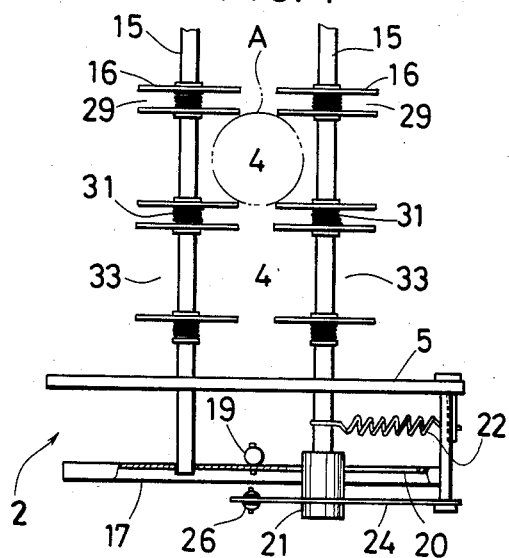
FIG. 4 is a plan view of the principal portion of a lower delivery device.
Figure 5:
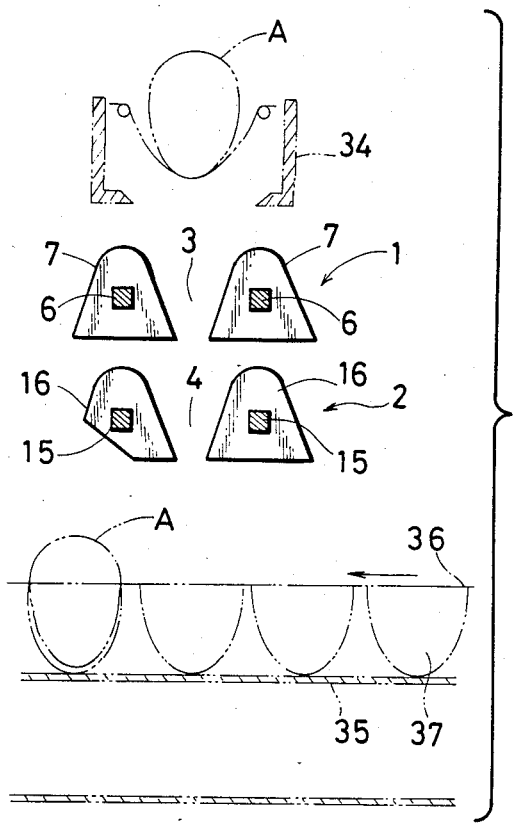
FIG. 5 is a longitudinally sectional view of the principal portion in the FIG. 1 embodiment.

The lower device 2 comprises two rods 15 and a plurality of support segments 16 formed of soft and elastic material, such as nylon, and juxtaposed and spaced at proper intervals, the support segments 16 at each rod 15 being spaced in proper intervals lengthwise of the device and opposite and parallel to each other, thereby forming the receiving seats 4 each surrounded by four seats, respectively, as shown in FIG. 4. The lateral ends of rods 15 are mounted onto lifting bases 17 so that the rods 15 are adapted to move vertically in reciprocation together with the lifting bases 17. Each lifting base 17 is adapted to move vertically in reciprocation by use of an eccentric cam 18 through a connecting rod 19 along the outside surface of each frame side plate 5. The bottom of each receiving seat 4 is open or closed by adjusting the distance between the rods 15 carrying the support segments 16 opposite to each other, which should be carried out within one vertical reciprocation of lower device 2 and with predetermined timing.

The embodiment of the invention shown in the drawing is constructed as follows: Among the rods 15 disposed longitudinally of the device, the front rod 15 is fixed at both lateral ends to the lifting bases 17 respectively, the rear rod 15 being supported at both lateral ends slidably longitudinally through slide members 21 into elongate slots 20 bored at the lifting bases 17. Tension springs 22 for rearwardly pulling the rear rod 15 are provided between each end thereof and the proper position at each side frame 5. Also, a T-like-shaped control member 24, having a vertically long slide surface 23, is pivoted at the upper rear end longitudinally swingably to each side frame 5 to thereby allow the slide surface 23 to abut against each slide member 21. An accentric cam 25 allows the control member 24 to swing longitudinally of the device with the predetermined timing through a connecting rod 26 provided at the upper front end of control member 24 so that the slide member 21 moves vertically and smoothly slidably on the slide surface 23 at the control member 24 following the vertical reciprocation of lower device 2. When the control member 24 swings forwardly, the slide member 21 moves forwardly against the spring 22, and when the same swings rearwardly, the slide member 21 moves rearwardly by means of spring 22. Hence, the rear rod 15 connecting with the slide member 21 is adjusted of a distance from the fixed front rod 15 under the predetermined timing, thereby enabling the regular opening and closing of the bottom of each receiving seat 4.

Figure 10:
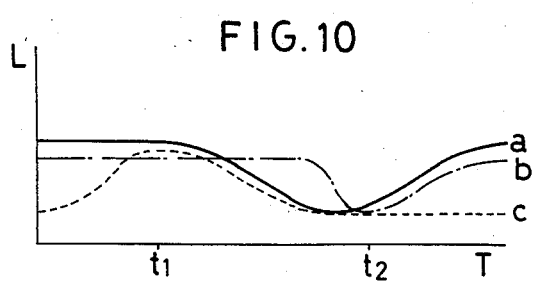
FIG. 10 is an illustration of the operational timing for opening and closing the bottom at each receiving seat at the upper and lower delivery devices, and for vertical movement in reciprocation of the lower delivery device, in which the axis of abscissa represents a distance L of movement and the axis of ordinate a time T.

The eccentric cams 13, 18 and 25 coaxially rotate on a rotary axis 27 in common and are adapted to function every one rotation of shaft 27, the connecting rods 14, 19 and 26 engageable with the respective eccentric cams 13, 18 and 25 being provided to move in the same directions in unity. FIG. 2 shows the cams 13, 18 and 25 in typical construction and combination thereof. FIG. 10 is an illustration of the operational timing of a group of cams in combination, in which the solid line a represents the vertical movement in reciprocation of lower device 2, the one-dot chain line b represents opening and closing of the bottom of receiving seat 4 following the movement of lower device 2, the dotted line c represents a curve regarding opening and closing of the bottom of receiving seat 4, $t_1$ represents the time of opening the bottom of receiving seat 3 at the upper unit 1, and $t_2$ represents the time of opening the bottom of receiving seat 4 at the lower device 2. These cam means, which all serve as linear reciprocation mechanisms, may of course be replaced by, for example, a crank means, an air cylinder, or a solenoid for the purpose of selective use.

The receiving seats 3 and 4 at the upper device 1 and lower device 2 are designable almost similarly in formation or construction. In a typical construction in the drawing, the rods 6 and 15 each square in section perforate the saddle-like-shaped support segments 7 and 16 formed of nylon and spaced at regularly and alternately larger and smaller intervals. Springs 30 and 31 are interposed in the respective smaller intervals 28 and 29 to supply elasticity to the support segments 7 and 16, respectively. The larger intervals 32 and 33 between the support segments 7 and between those 16 parallel and opposite to each other form the receiving spaces for the objects to be handled. The upper and lower devices, of course, need only select the shape and construction to conform to the objects to be handled, the support segments 7 and 16 also being selective of formation or material.

Next, explanation will be given on the shifting of the objects to be handled and the operational effect.

A large number of the objects A (eggs in the embodiment shown) to be handled are transported in succession by a discharge conveyor 34 FIG. 1, and discharged upon reaching the predetermined position. The discharge of the objects may be carried out for sorting them in the size, packing them into the predetermined container, or sorting and packing the same simultaneously with each other. In any case, the discharged objects A are received by the receiving seats 3 at the upper device 1. The receiving seats 3, which are formed of support segments 7 of elasticity and separate from each other, will receive the objects in a soft handling manner.

Figure 6:
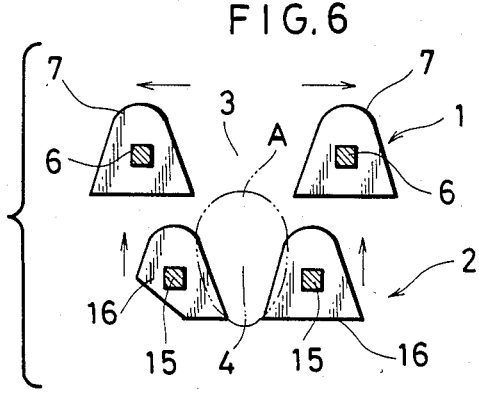
FIG. 6 is a longitudinally sectional view of the principal portion of the FIG. 1 embodiment, showing the bottoms of receiving seats at the upper delivery device in an open condition.
Figure 7:
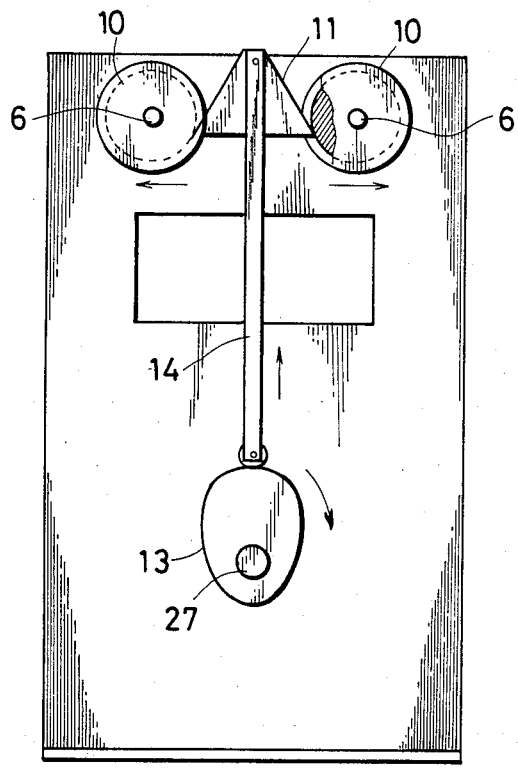
FIG. 7 is a side view showing arrangement of an eccentric cam, a connecting lever, a wedge plate, rollers and spindles.

The plurality of receiving seats 3 are laterally juxtaposed and when all the receiving seats 3 are filled with the objects A, an electric signal of a proper sensor system or a counter system actuates a proper drive device (not shown) so that rotary shaft 27 is subjected to slow rotation restricted to one rotation and the cams 13, 18 and 25 rotate simultaneously with each other. Cam 13, as shown in FIGS. 6 and 7, at first acts to push the wedge plate 11 upwardly through the connecting rod 14 and push rods 6 to expand outwardly the interval therebetween. Thus, the bottom of each receiving seat 3 is open and the objects A are dropped.

At this time, however, the lower device 2, together with the lifting bases 17 has already been pushed upwardly by cams 18, and approaches just below the objects A to be handled. The receiving seats 4 are closed at the bottoms because the control members 24, in association with the cams 25, control the rods 15 to reduce the distance therebetween. Each object A drops a short distance onto each receiving seat 4 and is received softly thereby.

Next, the lower device 2 lowers following retraction of each cam 18 and approaches the delivery conveyor 35, at which time the control members 24 continuously control the rods 15, respectively, so that the bottoms of receiving seats 4 are kept so as not to drop the objects A during the lowering of lower device 2.

Figure 8:
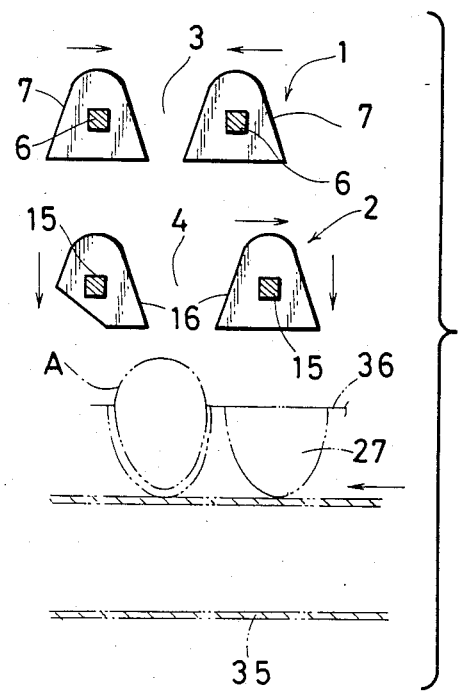
FIG. 8 is a longitudinally sectional view of the bottoms of receiving seats at the lower delivery device in an open condition.
Figure 9:
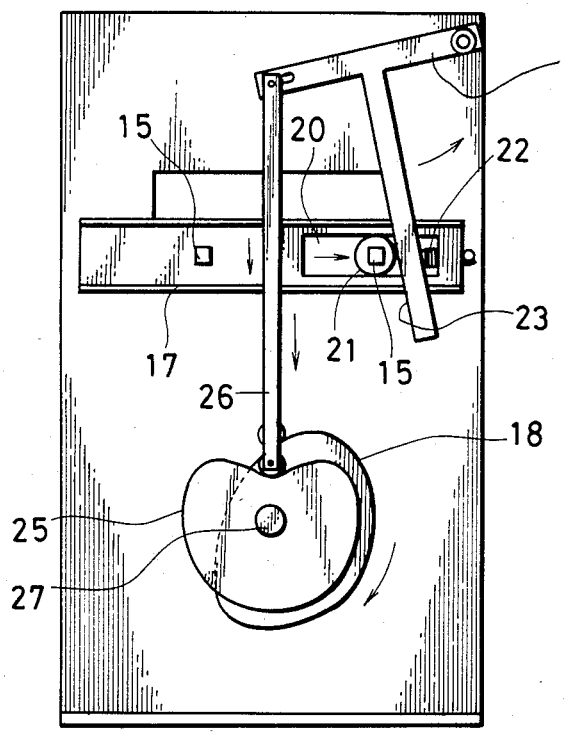
FIG. 9 is a side view showing arrangement of eccentric cams, a connecting lever, a control member, a slidable member, and spindles, in the mode of FIG. 8.

Next, at the time that the lower device 2, as shown in FIGS. 8 and 9, moves from the end of the lowering stroke to the beginning of the lifting stroke, cams 25 retract to release control members 24. Hence, the distance between rods 15 is enlarged to open the bottoms of receiving seats 4, so that the object A being handled are dropped at a little head and in a row onto the receiving conveyor. If the bottoms of receiving seats 4 are open when the lower device 2 transits slightly to the lifting stroke, after the end of the lowering stroke, the inertia for the drop of object A, following the lowering stroke of lowering device 2, is interrupted to enable a further soft drop of each object A onto the receiving conveyor 35.

After the objects A being handled are placed on the receiving conveyor 35, the lower device 2 lifts, at which time, if the bottoms of seats 4 are closed earlier, there is the danger of catching the object A between the seat bottoms and injuring the object. Thus, each cam 25 is designed to start the closure of the seat bottom after the lower device 2 lifts to some extent and finishes closure of the bottom before the lower device 2 lifts in close proximity to the upper device 1.

The receiving conveyor 35 is adapted to turn little by little in a proper distance by use of electromagnetic clutch system, braking pack system, or other proper intermittent drive means (not shown). Therefore, in the moment of transition of lower device 2 to its lifting stroke, upon driving the receiving conveyor 35 by electric signals or the like, the objects A being handled are transferred in one row and forwardly a proper distance, to thereby prepare the position for the objects A to be subsequently dropped onto the receiving conveyor 35. A proper packing container 36, placed on the receiving conveyor 35, is automatically packed.

The objects A being handled, as previously stated, are received by the receiving conveyor 35 or the packing container 36 placed thereon. A large number of separate receiving seats 37 are formed usually lengthwise and crosswise and in high density in the receiving conveyor or container, so that the objects A are crowded into the receiving seats in such a manner that the adjacent objects A are in contact with each other.

Hence, in this embodiment, as a means for allowing the bottoms of receiving seats 4 to be open sufficiently larger in the restricted space, the front rod 15 is fixed and the rear one only is adapted to move rearwardly toward a larger space.

On the other hand, the cam 13 is so designed that the bottoms of receiving seats 3, as upper device 1 are closed immediately after the objects A being handled are transferred to the lower device 2. Hence, prior to a finish of the lifting stroke of lower device 2, preparation for receiving the subsequent objects A into the upper device 1 is completed. It is also possible to complete receipt of objects A prior to the aforesaid finish. In other words, the above is one cycle of shifting the objects A, which is carried out in an extremely short time.

As seen from the above, the shifting device of the invention is used as a machine for sorting or packing in a large quantity and in succession Fruits and, especially, breakables such as eggs, are handled with high safety, at superior speed. The device is simple and strong in construction, and inexpensive to produce.

While a preferred embodiment of the invention has been described using specific terms, such description is for illustrative purpose only, and it is to be understood that changes and variations may be made without departing from the spirit or scope of the following claims.

I claim:

1. A shifting device for objects, such as eggs, which shifting device is between a discharge conveyor above said shifting device and a receiving conveyor belt said shifting device, said shifting device comprising upper and lower delivery devices spaced vertically in alignment, one above the other, between said conveyors, each of said delivery devices having a pair of parallel spaced rods extending horizontally and parallel to said conveyors, each of said rods having a plurality of support segments juxtaposed and spaced at intervals along said rods, said segments on one of said parallel spaced rods being aligned with said segments on the other of said parallel spaced rods, the aligned pairs of segments on said parallel spaced rods forming said upper and said lower delivery devices forming seats for receiving said objects to be shifted from said discharge conveyor above said shifting device to said receiving conveyor below said shifting device, means for mounting said upper delivery device in fixed position vertically below the discharge end of said discharge conveyor and for mounting said lower delivery device vertically below said upper delivery device and above the receiving end of said receiving conveyor, said mounting means including means for moving said lower delivery device vertically upward toward said upper delivery device for shifting an object in the seat of said upper delivery device to the aligned seat of the lower delivery device and for moving said lower delivery device vertically downward toward said receiving conveyor for shifting an object in the seat of said lower delivery device to said receiving conveyor, means for moving said parallel spaced rods of said upper delivery device outwardly parallel to each other for opening said seats of said upper delivery device for shifting objects in said seats of said upper delivery device to the seats of said lower delivery device when said delivery device is moved vertically upward toward said upper delivery device for said object shifting and for returning said spaced rods parallel inward to close said seats after said objects are shifted and said lower delivery device is moved vertically downward and means for moving said parallel spaced rods of said lower delivery device outwardly parallel to each other for opening said seats of said lower delivery device when said lower delivery device is moved vertically downward toward said receiving conveyor for shifting said objects in said seats of said lower delivery device to said receiving conveyor and for returning said spaced rods of said lower delivery device parallel inward to close said seats after said objects are shifted and said lower delivery device is moved vertically upward, said means for opening and closing of said seats on said upper and lower delivery devices and said means for moving said lower delivery device vertically including eccentric cams mounted on a common rotary shaft for coaxial rotation.

2. A shifting device for objects, such as eggs, according to claim 1, wherein opening and closing of said seats at said lower delivery device during the vertical movement of said lower delivery device is carried out by a control member having a slide surface vertically longer than said vertical movement and swingable longitudinally of said device.

* * * * *